United States Patent Office 3,767,705
Patented Oct. 23, 1973

3,767,705
PROCESS FOR PRODUCING N-METHYL-N-VINYL ACETAMIDE
Herbert Eck, Manfred Hannebaum, Joseph Heckmaier, and Hellmuth Spes, Burghausen, Upper Bavaria, Germany, assignors to Wacker-Chemie G.m.b.H., Munich, Bavaria, Germany
No Drawing. Filed Apr. 20, 1970, Ser. No. 30,281
Claims priority, application Germany, Apr. 18, 1969,
P 19 19 797.8
Int. Cl. C07c 103/30
U.S. Cl. 260—561 R    3 Claims

ABSTRACT OF THE DISCLOSURE

Process for producing N-methyl-N-vinyl acetamide by reacting dimethylazomethine with acetic acid anhydride and a tertiary amine in a quantity of 0.1–0.5 mol, referred to 1 mol dimethylazomethane, in an inert solvent at a temperature of −30 to 20° C., then heating the reaction mixture to split off the acetic acid, neutralizing the reaction mixture and separating therefrom the solid non-distillable parts, extracting the resulting condensate and distillate, and collecting and fractionating the organic layers.

It is known how to obtain N-methyl-N-vinyl acetamide by reacting dimethylazomethine with acetic acid anhydride in the presence of triethylamine in an inert solvent, extracting the neutralized reaction mixture with an inert solvent, sometimes drying the organic layer and subsequently fractionally distilling.

In such process triethylamine has the task of protecting N-methyl-N-vinyl acetamide from the resulting acetic acid which can otherwise, under the given conditions, split off the vinyl group forming N-methyl acetamide. Theoretically 1 mol of triethylamine is necessary for this per mol of azomethine used. This quantity has always been used in the process up to now.

A disadvantage of the methods used so far is the poor layer separation during extraction which is caused by a mucus-like intermediate layer and results in a low throughput and a poor volume-time yield.

We have now discovered a process for producing N-methyl-N-vinyl acetamide from dimethylazomethine and acetic acid anhydride in the presence of an inert solvent and of a tertiary amine, extraction of the neutralized reaction mixture with an inert solvent, sometimes drying of the organic layer and subsequent fractional distillation.

The process is characterized by the fact that one converts dimethylazomethine with acetic acid anhydride and a tertiary amine, this in a quantity of 0.1–0.5 mol, preferably 0.2–0.4 mol, referred to 1 mol dimethylazomethine, at a temperature of −30 to 20° C., preferably −20 to 5° C., then preferably heats to the boiling point of the solvent in order to split off the acetic acid, neutralizes the reaction mixture and separates therefrom the solid, non-distillable parts in a vacuum before extraction. Suitable for this are rotary evaporators, continuous distilling equipment or thin-layer evaporators.

No loss of yield or reduction in the purity of the product results from the use of a smaller quantity of amine, while a purer product is obtained by the separation of the solid, non-volatile parts of the fractionated distillation. The yield is also increased by this method.

Suitable tertiary amines are those which can be separated from N-methyl-N-vinyl acetamide by distilling, e.g. triethylamine, pyridine, quinoline and triethylene diamine.

Suitable as solvents and extraction agents are besides benzene also other, inert solvents like petrolether, cyclohexane, toluene, chloroform, ether and tetrahydrofurane.

For the neutralization of the acetic acid one can use aqueous solutions with a pH value of 7.5–10.5, for instance aqueous solutions of sodium carbonate or potassium carbonate.

EXAMPLE 1 mol dimethylazomethine is dissolved in 30–50 ml. benzene and treated at −15° to −5° C. with a mixture of 1 mol acetic acid anhydride and a tertiary amine (kind and quantity to be taken from the following table) within 50 minutes. The reaction mixture is left standing for about 12 hours at −10° to 0° C., and finally it is heated for 2 hours under reflux. The separation of the potassium acetate which was formed during neutralizing with a 30% aqueous potassium carbonate solution (½ mol $K_2CO_3$) is performed at about 1 mm. mercury column in a Sambay evaporator at 90° jacket temperature.

The resulting condensate and distillate are purified, extracted three times with 50 ml. benzene and the collected organic layers are fractionated through a 1 m. long column, filled with 6 mm. Raschig rings. At 12 mm. mercury column, the boiling point of N-methyl-N-vinyl acetamide is 56–56.5° C.

TABLE

| Tertiary amine used | Mol tertiary amine | Solid Particles separated before extraction | Yield,[1] percent | Purity,[2] percent |
|---|---|---|---|---|
| Triethylamine | 1.05 | No | 79 | 98.5 |
| Do | 1.1 | Yes | 81 | 99.9 |
| Do | 0.3 | No | 77 | 99.3 |
| Do | 0.3 | Yes | 82 | 99.8 |
| Triethylene diamine | 0.15 | Yes | 83 | 99.8 |
| Pyridine | 1.1 | No | 75 | 97.3 |
| Do | 0.3 | Yes | 75 | 97.4 |

[1] Calculated on a 100% product of the pure fraction.
[2] Determined gas-chromatographically on a GC M of the firm Beckmann Instruments G.m.b.H., Munich, Germany. Detector: FID; column filling kieselguhr (Merck), 0.2–0.3 mm. with 22% silicon oil AR 2000.

Among other important uses for the products of the invention are as emulsifiers in the manufacture of polymers and copolymers.

The invention claimed is:
1. Process for producing N-methyl-N-vinyl acetamide wherein dimethylazomethine is reacted with acetic acid anhydride and a tertiary amine in a quantity of 0.1–0.5 mol, referred to 1 mol dimethylazomethine, in an inert solvent at a temperature of −30 to 20° C., wherein the reaction mixture is heated to split off the acetic acid, the reaction mixture is then neutralized and the solid non-distillable parts are separated therefrom, the resulting condensate and distillate are extracted, and the organic layers are collected and fractionated.
2. Process according to claim 1, in which the heating to split off the acetic acid is performed at the boiling point of the solvent.
3. Process according to claim 1, in which the tertiary amine is one which can be separated from N-methyl-N-vinyl acetamide by distilling and is selected from the group consisting of triethylamine, pyridine, quinoline and triethylene diamine.

References Cited
UNITED STATES PATENTS
3,317,603  5/1967  Blance et al. _____ 260—561

E. G. LOVE, Assistant Examiner
LEWIS GOTTS, Primary Examiner